July 19, 1932.    J. B. CROCKETT    1,867,881
MANUFACTURE OF RUBBER ARTICLES
Filed May 14, 1929
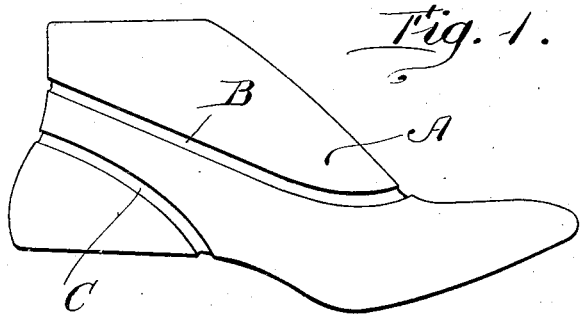
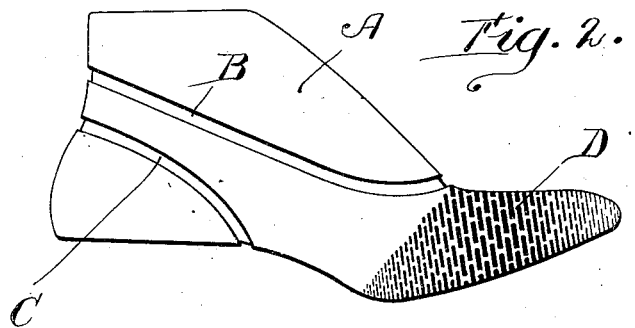
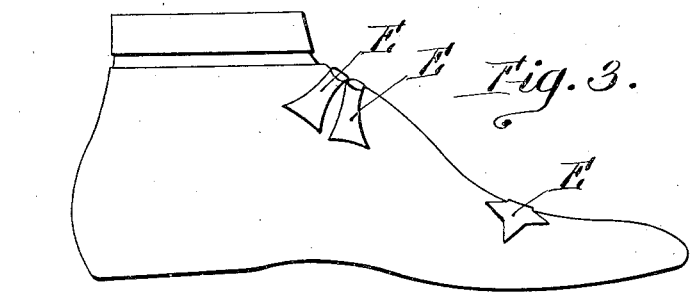
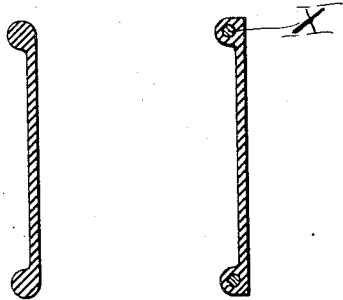
Inventor
James Barret Crockett
by Juse A. Holton
Atty Patented July 19, 1932

1,867,881

UNITED STATES PATENT OFFICE

JAMES BARRET CROCKETT, OF CAMBRIDGE, MASSACHUSETTS, ASSIGNOR TO CAMBRIDGE RUBBER COMPANY, OF CAMBRIDGE, MASSACHUSETTS, A CORPORATION OF MASSACHUSETTS

MANUFACTURE OF RUBBER ARTICLES

Application filed May 14, 1929. Serial No. 363,098.

This invention relates to a method of manufacturing a rubber article, one surface of which will have a raised or sunken pattern and/or trimming of pre-determined design. More specifically, it comprises a method of producing an article or sheet of rubber by depositing aqueous rubber containing material or compounds on a form having grooves, recesses, figures or designs, cut, moulded, sunk in or raised or attached to its surface. The invention also contemplates the article produced by the process.

The objects, briefly stated, are an improved and economical method of forming a rubber article by dipping, spreading, spraying or like operation, having a pre-determined raised or sunken design on one surface.

Another object is to produce such article at a low cost by a sequence of dipping or like operations. Still another object is to produce an article of new and novel appearance having on one surface thereof an ornamental or reinforcing, raised or sunken design.

Still another object is to produce such designs in colors varying or different from the surface on which they are imposed.

The invention may be carried out by taking any material suitable for a form or by taking forms such as now ordinarily employed in the shape of the article or sheet to be produced and sinking, cutting or moulding on its surface grooves, figures, ornamental or other designs. Alternatively, the designs may be raised, attached to or imposed on the surface of the form in a permanent or temporary manner. The form or surface thus specially prepared may then be dipped into any aqueous rubber containing material or compound or such rubber containing material may be applied by spreading, spraying or any other convenient manner evenly distributed over the form and allowed to dry. When the coating is dry in order to build up the deposited rubber to the desired thickness or body successive coatings are applied and dried until the desired result is obtained.

The deposited rubber or rubber compound is then finally dried and/or vulcanized and stripped from the form. The designs are thereby imparted to one surface of the rubber sheet or article. In the case of designs sunk on the surface of the form before contacting the form with the aqueous rubber contained material or compound, the sunken or recessed portions may be filled in with an aqueous rubber containing paste or compound which may or may not be of a different color from the continuous coating which is next applied. The recesses or grooves may of course be previously filled with other material such as properly cut, vulcanized or unvulcanized rubber. In the case of raised designs temporarily attached to the form, these will most generally be of sheet material such as rubber, leather, fabric or the like previously cut to shape and temporarily attached to the form so that when the aqueous rubber containing material is contacted with their exposed surface they become during drying permanently attached and integral with the deposited coating and stripped from the form with same. The pieces of sheet material may be of colors contrasting with that of the following coating.

The invention may be applied in various ways and means in the manufacture of rubber articles from aqueous rubber containing materials or compounds. For example, in the manufacture of a dipped rubber shoe of the type generally known as a foothold. Where the body of the shoe is built up by repeatedly dipping a form in the shape of a last in aqueous rubber containing material means must be found to conveniently designate the outline of the shoe so that it may be conveniently cut and trimmed and present a finished edge with a reinforcing bead or trimming.

As an example, one method of carrying out the invention, for instance, in the manufacture of a dipped shoe, reference is made to Figure 1 of the accompanying drawing. A is a form in the shape of an ordinary last of any suitable material such as metal or wood in which the grooves B and C are cut to define the outline of the shoe and to form reinforcing and finishing portions or beads; simultaneously with the forming of the body of the shoe such reinforcing and trimming portions may be formed merely by the aqueous rubber containing material flowing into and filling the grooves as shown in Fig. 4 or the grooves may be previously filled with an aqueous rubber containing paste or compound which may be of a different color or they may be filled with other materials such as a cut rubber strip or cord without extending same or such reinforcing cut rubber strip or cord may be inserted in the grooves between any of the successive dips or coatings during the formation of the body of the shoe and completely closed or covered thereby as shown in Fig. 5 at X.

Figure 2 shows a similar last having grooves cut as in Figure 1 for the same purpose and in addition thereto an ornamental design D cut or sunk over the entire surface to produce in the finished article an effect similar to that obtained in embossed leather or alligator or reptile skin. The rubber shoe produced on the forms as shown in Figures 1 and 2 is of course turned inside out to bring the designs and/or reinforcing trimming on the outside or exterior of the article.

Still another example is shown in Figure 3 wherein a suitable form for producing a bathing shoe by contacting with aqueous rubber containing material is shown, having a sunken portion around the top for the reinforcing and/or ornamental trimming which may be obtained in the same manner as described in 1 and 2, and also temporarily attached to the form cut pieces E of sheet rubber in the shape of ornamental designs, said material being properly adapted to permanently adhere to the deposited coating applied to and dried on the form.

It should be understood that the above examples are merely illustrative as it is obvious that the invention is capable of many variations.

The aqueous suspension of rubber employed may consist of a vulcanizable latex mix, i. e., rubber latex in natural, concentrated, purified, thickened or stabilized form or treated in any way desired, containing vulcanizing ingredients, and an accelerator or accelerators active at normal or at elevated temperatures. Such mixes may contain fillers, reinforcing matter, pigments and colors, to produce the required physical wearing and aging properties in the deposited rubber. After the article is formed by dipping in such a vulcanizable latex mix, vulcanization will of course be resorted to at a suitable stage of the process, preferably before stripping from the form, and may be effected at normal or elevated temperatures in dry heat, steam or hot water, or any of the known ways convenient. Alternatively, the article may be formed from a latex mix and vulcanized by the application of sulphur chloride.

The aqueous suspension of rubber may also consist of pre-vulcanized rubber latex such as obtained in following the procedure disclosed in U. S. Patents Nos. 1,443,149 dated January 23, 1923 and 1,682,857 dated September 4, 1928. Such pre-vulcanized latex compounded or not with fillers, pigments, dyes and like material is preferred in most instances on account of the ease and exactness of control of the degree of cure. It may be obtained in stabilized form in the most suitable concentration, viscosity, and degree of cure for forming the article desired. Handling and production are also facilitated by eliminating the step of vulcanization after the article is formed. The properties of the rubber deposited from such pre-vulcanized latex are of the highest order.

Aqueous dispersions of previously coagulated or reclaimed rubber artificially obtained by mechanical and/or chemical means may also be employed where their properties permit, and in either a vulcanized or unvulcanized condition.

The dipping, spraying or spreading operation may be carried out by hand or by mechanical means and details of forming, draining and drying are not further referred to as they will be well understood by those skilled in the art.

The invention particularly provides a simple and direct method of producing a fully trimmed, reinforced, ornamented and completed article by dipping and like processes.

What I claim is:—

1. The process of making rubber articles which consists in making a former with depressions, first filling the depressions with material unitable by contact with an aqueous rubber containing material and then contacting the former with an aqueous rubber containing material to coat the former and merge the filling with the coat.

2. The process of making rubber articles which consists in making a former with depressions, first filling the depressions with material unitable by contact with an aqueous rubber containing material and then contacting the former with an aqueous rubber containing material to coat the former and merge the filling with the coat, drying and removing the resultant article and turning the same inside out.

3. The process of making rubber articles which consists in grooving a former at the marginal regions of the article to be produced, filling the grooves with an aqueous rubber containing material, contacting the former with an aqueous rubber containing material thereby coating the last and homogeneously uniting the coating with the filling in the grooves, drying, and removing the dried product from the former.

4. The process of making rubber articles which consists in grooving a former at the marginal regions of the article to be produced, filling the grooves with an aqueous rubber containing material, contacting the former with an aqueous rubber containing material thereby coating the last and homogeneously uniting the coating with the filling in the grooves, drying, and removing the product from the former and turning the product inside out.

5. The process of making rubber articles which consists in grooving a former at the marginal regions of the article to be produced, filling the grooves with an aqueous rubber containing material in which is embedded a cord, contacting the former with an aqueous rubber containing material thereby coating the last and uniting the coating with the filling in the grooves, drying, and removing the dried product from the former.

6. The process of making rubber articles which consists in grooving a former at the marginal regions of the article to be produced, filling the grooves with an aqueous rubber containing material in which is embedded an unstressed cord of vulcanized or unvulcanized rubber, contacting the former with an aqueous rubber containing material thereby coating the last and uniting the coating with the filling in the grooves, drying, removing the dried product from the former and turning the product inside out.

7. The process of making rubber articles which consists in providing a former with depressions particularly along the marginal regions of the article to be produced, applying a rubber filler to the depressions such as an aqueous paste, natural rubber latex, vulcanized latex or a rubber strip or cord, contacting the former with an aqueous rubber containing material to coat the former, drying the product and removing same from the former.

8. The process of making rubber articles which consists in providing a former with a groove, building a body on said former by dipping same repeatedly in an aqueous rubber containing material, laying a cord in said groove between dipping operations, drying the product and removing same from the former.

JAMES BARRET CROCKETT.